Aug. 31, 1948.  E. A. ROCKWELL  2,448,466
FOLLOW-UP PRESSURE FLUID SERVOMOTOR
Filed June 4, 1943  3 Sheets-Sheet 1

INVENTOR
EDWARD A. ROCKWELL
BY
ATTORNEY

Aug. 31, 1948.  E. A. ROCKWELL  2,448,466
FOLLOW-UP PRESSURE FLUID SERVOMOTOR
Filed June 4, 1943  3 Sheets-Sheet 3

INVENTOR
EDWARD A. ROCKWELL.
BY
Arthur Wright
ATTORNEY

Patented Aug. 31, 1948

2,448,466

UNITED STATES PATENT OFFICE 2,448,466

FOLLOW-UP PRESSURE FLUID SERVOMOTOR

Edward A. Rockwell, Cleveland, Ohio

Application June 4, 1943, Serial No. 489,713

1 Claim. (Cl. 121—41)

My invention relates particularly to mechanism for operating locomotive reverse gears or other parts to be moved of any desired character.

The object of my invention is to provide an improved type of valve mechanism in connection with locomotive reverse gears or other parts to be moved, operable by means of fluid pressures. Another object is to provide a new type of quick-acting modulator valve in connection with locomotive reverse gears, etc. Again, another object is to provide a valve mechanism for this purpose which saves compressed air or steam. Further objects of my invention will appear from the detailed description of the same hereinafter.

As to the valve structure, this is a construction in part of my copending application Ser. No. 397,896, filed June 13, 1941, upon Travel control actuating apparatus, now Patent No. 2,372,014.

While my invention is capable of embodiment in many different forms, for the purpose of illustration I have shown only one form thereof in the accompanying drawings in which Fig. 1 is a diagram of a locomotive reverse gear mechanism made in accordance with my invention;

Figure 1:
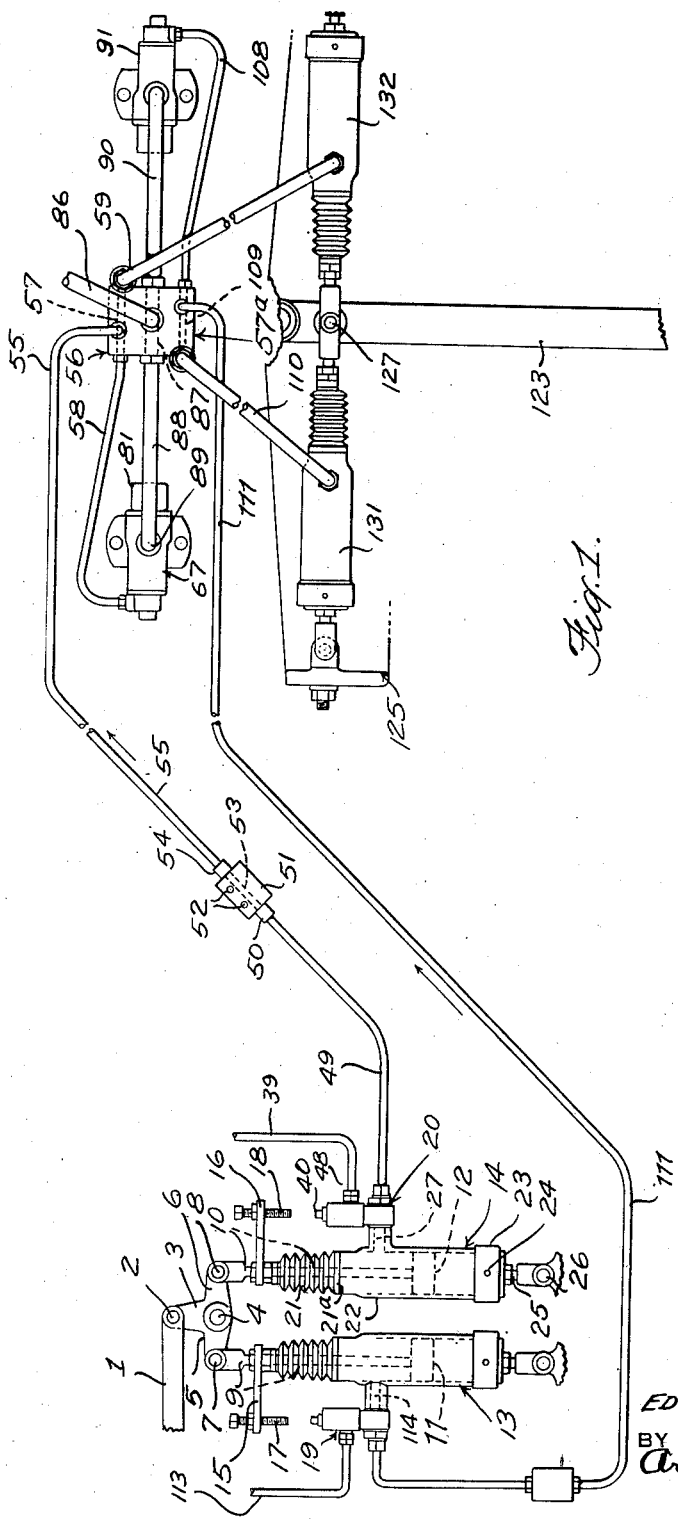

In the drawings, I have shown a manually operable link 1 connected by a pivot 2 to a rocker lever 3 located on a fixed pivot 4. The rocker lever 3 has arms 5 and 6 having pivotal connections 7 and 8, respectively, to piston rods 9 and 10, which are connected to pistons 11 and 12 in master cylinders 13 and 14, respectively. The piston rods 9 and 10 carrying thereon, respectively, valve operating arms 15 and 16 which have adjustable valve operating rods therein 17 and 18 for operating liquid compensator valves 19 and 20.

Figure 4:
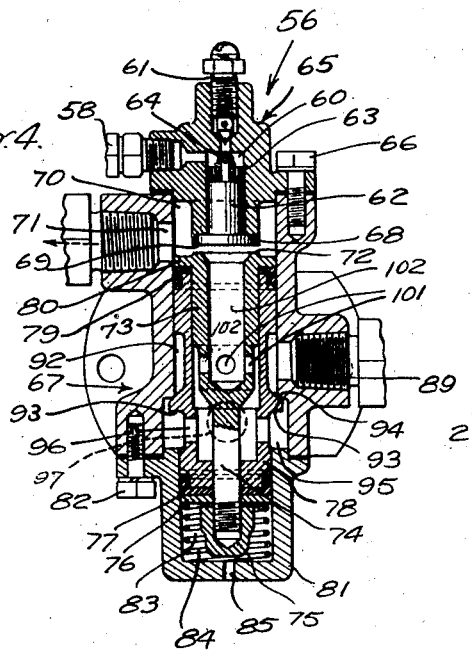
Fig. 4 is a horizontal section showing the details of the modulator valve therein.
Figure 5:
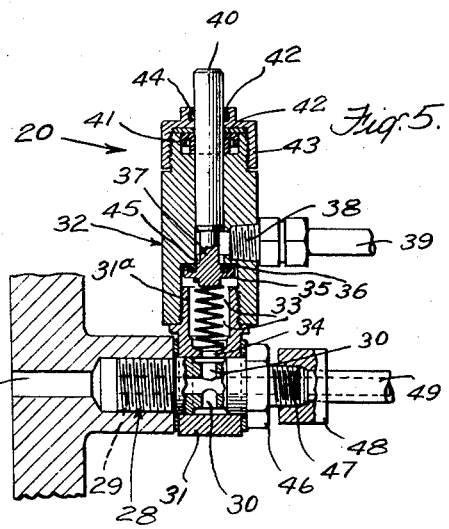
Fig. 5 is a vertical section of the liquid compensator valve therein.

As the master cylinders 13 and 14 and liquid compensator valves 19 and 20 are constructed exactly the same I shall describe in detail only the master cylinder 14 and the attached compensator valve. The master cylinder 14 has at the upper portion thereof a rubberboot 21 around the piston rod 10 and is connected at its lower end to a screw cap 21a on the top of a master cylinder casing 22, to the lower end of which there is attached a screw cap 23 having a vent opening 24. The said cap 23, furthermore, is screw-threaded to a rod 25 having an eye 26 for attachment of the same to any desired type of support. Above the piston 12 there is an outlet opening 27 into which there is screw-threaded an apertured member 28 having a longitudinal passageway 29 and transverse openings 30. Around the apertured member 28 there is located a member 31 having a vertical passageway 31a, said member 31 being screw-threaded to a valve casing 32 and provided with a coil spring 33 seated at its lower end against a shoulder 34 in the member 31. At its upper end the spring 33 bears against the underside of a valve member 35 having a rubber valve ring 36 therein, said valve members 35 having a reduced extension 37 to permit the passage into the valve casing 32 of hydraulic liquid or oil under pressure from a fitting 38 connected to a pipe 39 for supplying the said liquid under any desired pressure. Said valve member 35 also has a valve rod 40 which extends upwardly in the casing 32 through a rubber seal 41 held in place by a washer 42 and a screw cap 43 having the usual packing ring 44. The valve rod 40 is adapted to be moved downwardly when contacted by the adjustable rod 18 at the end of the manual strike. When seated the valve ring 36 seats against a shoulder 45 within the valve casing 32. Furthermore, the apertured member 28, at its outer end, carries a lock nut 46 and a screw-threaded end 47 to which there it attached a coupling 48 for connection to a flexible pipe 49 which leads to a fitting 50 on a supporting bracket 51 having holes 52 for attachment to any suitable fixed support. The bracket 51 has a passageway 53 and a fitting 54 for connecting it to a pipe 55 which conveys the liquid from the master cylinder 22. The said pipe 55, at its other end, is connected to a connection block 56, which is provided with a passageway 57 connected to the pipe 55, as well as to a pipe 58, for controlling the delivery of compressed air or steam and to a pipe 59 for co-ordinating the travel of the manual operating link 1 with the locomotive reverse gear, as hereinafter described. The pipe 58 communicates with a plunger chamber 60, shown in Fig. 4, having an air bleeder screw 61, upon the removal of which the accumulated air can be allowed to escape. The chamber 60 is provided with a valve plunger 62 operating in the chamber 60 having a rubber seal 63 supported on a headed screw 64 attached to the plunger 62. Said plunger 62 is carried by a cap 65 attached by screws 66 to a valve casing 67. The plunger 62, furthermore, has a head 68 provided with a flat valve seat 69 located in an annular chamber 70 communicating with an air exhaust port 71. The said head 68, furthermore, cooperates with a valve element 72 on a valve member 73 having on its end a stem 74 provided with a nut 75 which is adjacent to a washer 76 and a seal 77 seating on a plunger sleeve 78, which slides in the casing 67, having a seal 79 on the valve member 73 adjacent to a flange 80 on the end of said valve member 73. The seal 77 sheals the plunger sleeve 78 within a cap 81 connected by screws 82 to the valve casing 67. Within the said cap 81 there is a chamber 83 carrying a coil spring 84 for normally forcing the valve member 73 towards the left, as shown in Fig. 1, and a vent 85 is located in the cap 81 communicating with the outer air.

Compressed air or steam is admitted from any suitable supply pipe 86 to a passageway 87 in the connection block 56 so as to supply the same through a pipe 88 to an inlet port 89 in the valve casing 67 as well as to a pipe 90 leading to a second modulating valve 91 constructed in the same manner as the modulating valve connected to the pipe 88. The compressed air entering the port 89 is received in an annular chamber 92 in the periphery of the plunger sleeve 73 and adjacent to this chamber 92 the plunger sleeve 73 has a conical valve 93 adapted to seat on a valve seat 94 on the interior of the valve casing 67. When the valve 93, 94 is unseated by pressure from the plunger 62 the compressed air enters the annular chamber 92 and passes through ports 96 in the plunger sleeve 78 whence it is delivered by an outlet port 97 to a passageway 98 in an air cylinder 99 to which the valve casing 67 is attached by screws 100. The exhaust air, which also passes through the passageway 98 in the reverse direction when the valve 69, 72 is open, is released by passing through ports 101 into a central chamber 102, thence to the chamber 70 and finally to the exhaust port 71. The air cylinder 99 is closed at one end by a cylinder head 103. Also, said cylinder has a piston 104 attached to a piston rod 105 which passes out through an annular cylinder head 106. It will be noted that this end of the cylinder is also provided with a compressed air passageway 107 leading to the modulator valve 91 in the same way as previously described in regard to the passageway 98, for supplying the compressed air to and exhausting the same from the passageway 107, with the aid of the modulator valve 91, as it is provided with a hydraulic control pipe 108 like the control pipe 55. The said pipe 108 communicates with a passageway 109 which is connected to a travel control pipe 110 and to a pipe 111 which is connected to the compensator valve 19 like the compensator valve 20, said valve having a pipe 113 leading to a source of liquid under pressure and which may be the same source to which the pipe 39 is connected. The said liquid compensator valve is connected by an inlet port 114 to the master cylinder 13.

Figure 2:
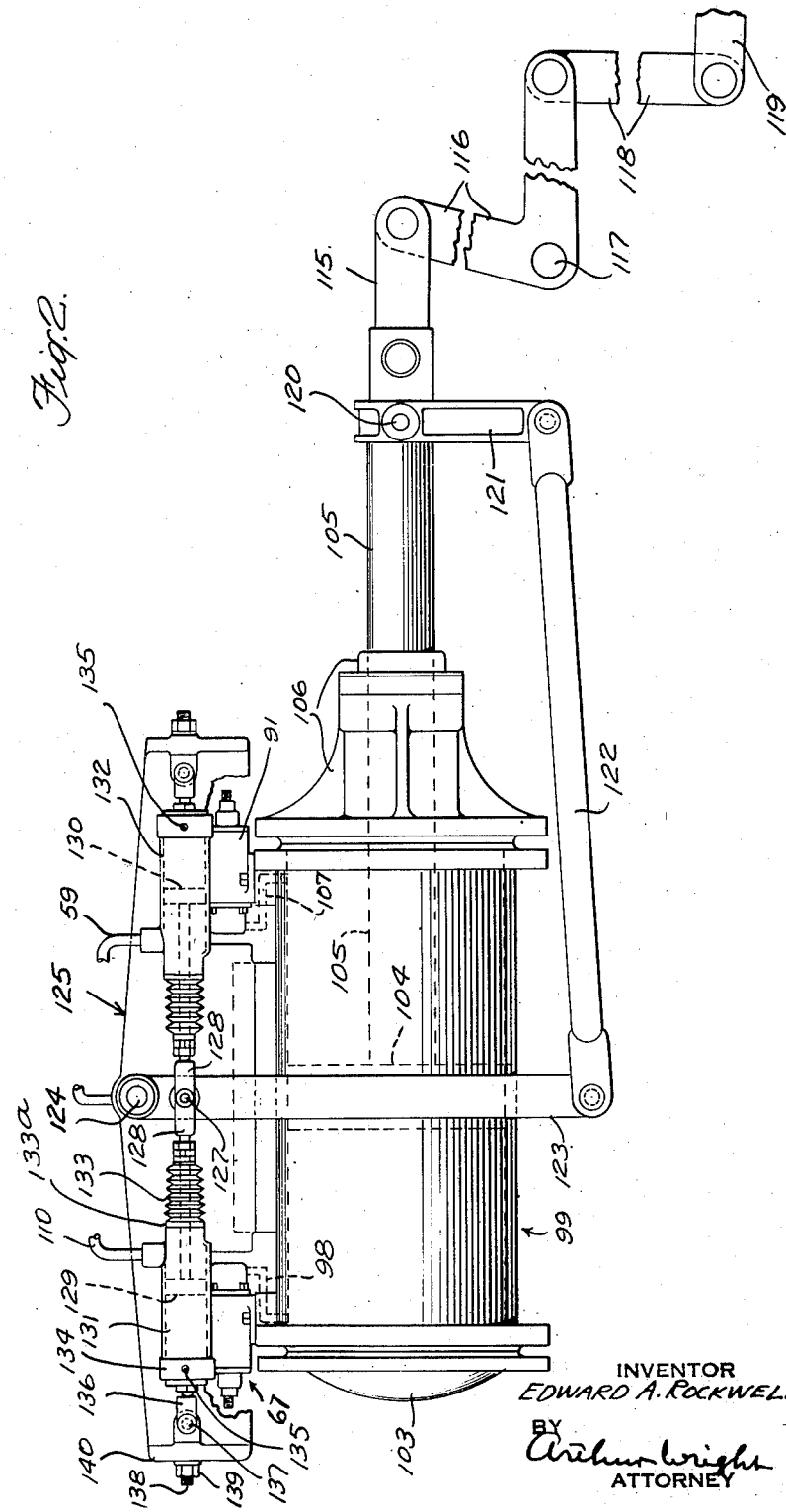
Fig. 2 is a side elevation of the same.
Figure 3:
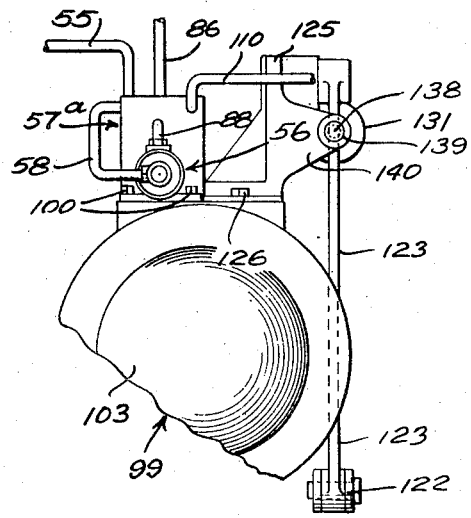
Fig. 3 is a end elevation thereof.

As will be seen in Fig. 2, the piston rod 105 is pivotally connected to a reach rod 115 which in turn is connected to a bell crank lever 116 on a fixed pivot 117 which in turn is pivotally connected to a lifting link 118 carrying a radius rod 119 which cooperates with the reverse lever of any desired reverse gear mechanism of a locomotive, as for example any of those shown in Marks, Mechanical Engineers Handbook, first edition, 1916, pages 975 to 977, published by McGraw-Hill Book Company, Inc., New York. Attached to the piston rod 105, by means of a screw 120, there is provided an arm 121 pivotally connected to a link 122, which in turn is pivotally connected to a lever 123 on a pivot 124 carried by a bracket 125 which is secured by screws 126 to the cylinder 99. The lever 123 has intermediate its ends a pivot pin 127 pivoted to two cross rods 128, the two ends of which are connected, respectively, to pistons 129 and 130 in travel control cylinders 131 and 132, which are both constructed alike and only one of which will, accordingly, be described in detail. The piston 129, which is located in the cylinder 131, passes through a rubberboot 133 attached to a screw head 133a on the cylinder 131. Said cylinder 131, furthermore, has a screw cap 134, provided with a vent opening 135, which is screw-threaded to a yoke 136 having a pivotal connection 137 to a bracket screw 138, provided with a nut 139, located on a flange 140 on the bracket 125.

In the operation of the locomotive reverse gear mechanism, in driving the locomotive forwardly the link 1 will be moved from its middle position, when the locomotive is at rest, to the left, in Fig. 1, whereupon the master cylinder piston 12 will be moved upwardly, forcing the liquid through the pipe 49 into the passageway 57 and pipe 58 to the plunger chamber 60. The plunger valve 69, 72 will then be closed, after which the valve member 73 unseats the valve 93, 94, thus admitting compressed air from the port 89 into the chamber 95 and thence through the port 97 into the passageway 98 to the left end of the air cylinder 99 against the left face of the piston 104. Simultaneously this will result in the release of air pressure through the passageway 107 from the other end of the air cylinder 99, which will pass out through the vent opening 71 in the end of the valve casing 91. Accordingly, the piston rod 105 will be moved to the right, thus moving the radius rod 119 to control the position of the reverse gear mechanism of the locomotive so as to drive the latter forwardly. At the same time, owing to the presence of the passageway 57, the piston 130 will be moved by the lever 123 connected to the piston rod 105 so as to be coordinate the travel of the manually movable link 1 with the piston 104 and therefore the radius rod 119. Thus, as the manual means 1 is moved to the left this will produce a movement of the piston 104 to the right and, owing to the lever 123 connected to the piston rod 105, the piston 130 will be moved to the right, thus increasing the volume in the chamber at the left of the piston 130 and coordinating the movement of the piston 130 with the piston 12. In the driving of the locomotive in the rearward direction the manual link 1 is moved in the opposite direction, that is to say to the right, thereby moving the piston 11 upwardly in the master cylinder 13 and delivering the liquid under manual pressure by the pipe 11 to the modulating valve casing 91, thus delivering compressed air by the passageway 107 to the right end of the air cylinder 99 while simultaneously releasing the air pressure by the passageway 98 at the left end of the air cylinder 99 through the valve casing 67. In this instance the travel control cylinder 131 will be operative to coordinate the movement of the piston 105 and the radius rod 119 with the piston 11 and the manual link 1 connected thereto in the same manner as just described in connection with the cylinder 132. In the end position of the movement of the piston 11 in the master cylinder 13, the adjustable rod 18 will contact with the valve rod 40 to open the valve 45 so as to equalize the liquid between the inlet pipe 39 and the delivery pipe 49 so as to bring the parts into phase connected thereto. Likewise, in the forward drive of the locomotive, in the end position, the adjustable rod 17 will contact with the valve rod in the compensator valve 19 to bring about the liquid compensation and phasing between the pipes 111 and 113.

While I have described my invention above in detail I wish it to be understood that many changes may be made therein without departing from the spirit of the same.

I claim:

In combination, a linkage suitable for operating a locomotive reverse gear, a compressed air motor, having a cylinder with a piston therein, for operating the same, and a hydraulic controlling means for the motor comprising master cylinders and modulating valves, each of said valves having a hydraulic actuating means for controlling the supply and exhaust of compressed air to said motor, said motor having hydraulic travel control cylinders and plungers operated by the motor, each master cylinder being connected to one of said actuating means to actuate said valves to operate the latter and to a travel control cylinder and plunger for movement of the master cylinder piston with the plunger, said motor having connected to each end of the cylinder thereof on opposite sides of the motor piston, for the operation of the motor piston in opposite directions, one of the said modulator valves and each one of said modulator valves having one of said hydraulic travel control cylinders and plungers connected thereto, each of said modulator valves having one of said master cylinders for operating the same, said master cylinders being provided with pistons in the master cylinders connected together by a manually operable lever for operating the master cylinders inversely with regard to each other so as to produce hydraulically a coordinate travel of the master cylinder pistons and the motor piston, said controlling means also having a connection block connected to a compressed air supply and therefrom to each of said modulator valves as well as being connected to each of said master cylinders and therefrom to each of said modulator valves as well as to each of the travel control cylinders and plungers.

EDWARD A. ROCKWELL.

REFERENCES CITED

The following references are of record in the file of this patent:

UNITED STATES PATENTS

| Number | Name | Date |
|---|---|---|
| 752,491 | Warren | Feb. 16, 1904 |
| 897,907 | Lang | Sept. 8, 1908 |
| 1,230,049 | Stafford | June 12, 1917 |
| 1,687,366 | Doolittle et al. | Oct. 9, 1928 |
| 2,061,120 | Vorech | Nov. 17, 1936 |
| 2,205,806 | Belenkij | June 25, 1940 |
| 2,243,385 | Levy | May 27, 1941 |
| 2,290,052 | Hughes | July 14, 1942 |
| 2,303,752 | Meredith | Dec. 1, 1942 |
| 2,306,346 | Rockwell | Dec. 22, 1942 |

FOREIGN PATENTS

| Number | Country | Date |
|---|---|---|
| 702,983 | Germany | Feb. 25, 1941 |